United States Patent
Chen et al.

(10) Patent No.: US 11,164,366 B2
(45) Date of Patent: Nov. 2, 2021

(54) MIXED REALITY OBJECT RENDERING BASED ON ENVIRONMENT LIGHTING

(71) Applicant: MICROSOFT TECHNOLOGY LICENSING, LLC, Redmond, WA (US)

(72) Inventors: Guojun Chen, Redmond, WA (US); Yue Dong, Redmond, WA (US); Xin Tong, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/479,547

(22) PCT Filed: Jan. 16, 2018

(86) PCT No.: PCT/US2018/013753
§ 371 (c)(1),
(2) Date: Jul. 19, 2019

(87) PCT Pub. No.: WO2018/136374
PCT Pub. Date: Jul. 26, 2018

(65) Prior Publication Data
US 2019/0362540 A1 Nov. 28, 2019

(30) Foreign Application Priority Data
Jan. 23, 2017 (CN) .......................... 201710059146.7

(51) Int. Cl.
*G06T 15/50* (2011.01)
*G06T 19/00* (2011.01)
(Continued)

(52) U.S. Cl.
CPC ............ *G06T 15/506* (2013.01); *G06T 15/04* (2013.01); *G06T 19/006* (2013.01); *G06T 19/20* (2013.01);
(Continued)

(58) Field of Classification Search
CPC . G06T 19/006; G06T 15/506; G06T 2215/12; G06T 2215/16; G06T 19/20;
(Continued)

(56) References Cited

U.S. PATENT DOCUMENTS 5,870,735 A 2/1999 Agrawal et al.
6,803,910 B2 10/2004 Pfister et al.
(Continued)

FOREIGN PATENT DOCUMENTS

WO 2016107635 A1 7/2016

OTHER PUBLICATIONS

Akenine-Moller, Thomas and Eric Haines. "Real-Time Rendering." 2nd ed. (2002), pp. 133-135 and 156-158. (Year: 2002).*
(Continued)

*Primary Examiner* — Daniel F Hajnik

(57) ABSTRACT

Implementations of the subject matter described herein relate to mixed reality rendering of objects. According to the embodiments of the subject matter described herein, while rendering an object, a wearable computing device takes lighting conditions in the real world into account, thereby increasing the reality of the rendered object. In particular, the wearable computing device acquires environment lighting information of an object to be rendered and renders the object to a user based on the environment lighting information. In this way, the object rendered by the wearable computing device can be more real and accurate. The user will thus have a better interaction experience.

20 Claims, 3 Drawing Sheets

(51) Int. Cl.
*G06T 19/20* (2011.01)
*H04N 5/232* (2006.01)
*H04N 5/235* (2006.01)
*G06T 15/04* (2011.01)

(52) U.S. Cl.
CPC ....... *H04N 5/2353* (2013.01); *H04N 5/23238* (2013.01); *G06T 2215/12* (2013.01); *G06T 2215/16* (2013.01); *G06T 2219/2012* (2013.01)

(58) Field of Classification Search
CPC ............ G06T 2219/2012; G06T 15/04; H04N 5/23238; H04N 5/2353
See application file for complete search history.

(56) References Cited

U.S. PATENT DOCUMENTS

| | | | |
|---|---|---|---|
| 7,719,544 | B2 | 5/2010 | Boyd et al. |
| 8,730,252 | B1 | 5/2014 | Moreton et al. |
| 9,288,476 | B2 | 3/2016 | Sandrew et al. |
| 9,417,692 | B2 | 8/2016 | Lamb et al. |
| 2004/0222988 | A1 | 11/2004 | Donnelly |
| 2012/0206452 | A1 | 8/2012 | Geisner et al. |
| 2014/0118353 | A1* | 5/2014 | Ha .................. G06T 15/506 345/426 |
| 2015/0279113 | A1 | 10/2015 | Knorr et al. |
| 2015/0289599 | A1* | 10/2015 | Uchida ............... H05K 5/0204 24/198 |
| 2015/0301592 | A1* | 10/2015 | Miller .................... G06F 3/016 345/156 |
| 2015/0325048 | A1 | 11/2015 | Engle et al. |
| 2016/0155261 | A1 | 6/2016 | Iborra Olba |
| 2016/0189426 | A1 | 6/2016 | Thomas et al. |
| 2016/0267720 | A1 | 9/2016 | Mandella et al. |
| 2018/0176483 | A1* | 6/2018 | Knorr ................ H04N 5/23222 |
| 2018/0211440 | A1* | 7/2018 | Kunkel ................ G06T 19/006 |
| 2019/0272626 | A1* | 9/2019 | Rhee .................... G06T 15/503 |

OTHER PUBLICATIONS

Douglas A Kerr "Average Scene Reflectance in Photographic Exposure Metering", Issue 1: 1-19 (2005).
International Search Report and Written Opinion for PCT/US2018/013753 dated Apr. 12, 2018.
Knecht, et al., "Differential Instant Radiosity for Mixed Reality", In Proceedings of IEEE International Symposium on Mixed and Augmented Reality, Oct. 13, 2010, 9 Pages.
Kolivand, et al., "Realistic Real-Time Outdoor Rendering in Augmented Reality", In Journal of Plos One, vol. 9, Issue 9, Sep. 30, 2014, pp. 1-14.
Konttinen, et al., "The Future of Mixed Reality: Issues in Illumination and Shadows", In Journal of Defense Modeling and Simulation, vol. 2, Issue 1, Jan. 2005, 11 Pages.
Kronander, et al., "Photorealistic Rendering of Mixed Reality Scenes", In Proceedings of 36th Annual Conference of the European Association for Computer Graphics, vol. 34, Issue 2, May 4, 2015, 23 Pages.
Spelitz, Stefan, "Color Distribution Transfer for Mixed-Reality Applications", In Proceedings of 18th Central European Seminar on Computer Graphics, May 25, 2014, 8 Pages.
"First Office Action and Search Report Issued in China Patent Application No. 201710059146.7", dated Jan. 11, 2021, 9 Pages.

* cited by examiner

FIG. 5A
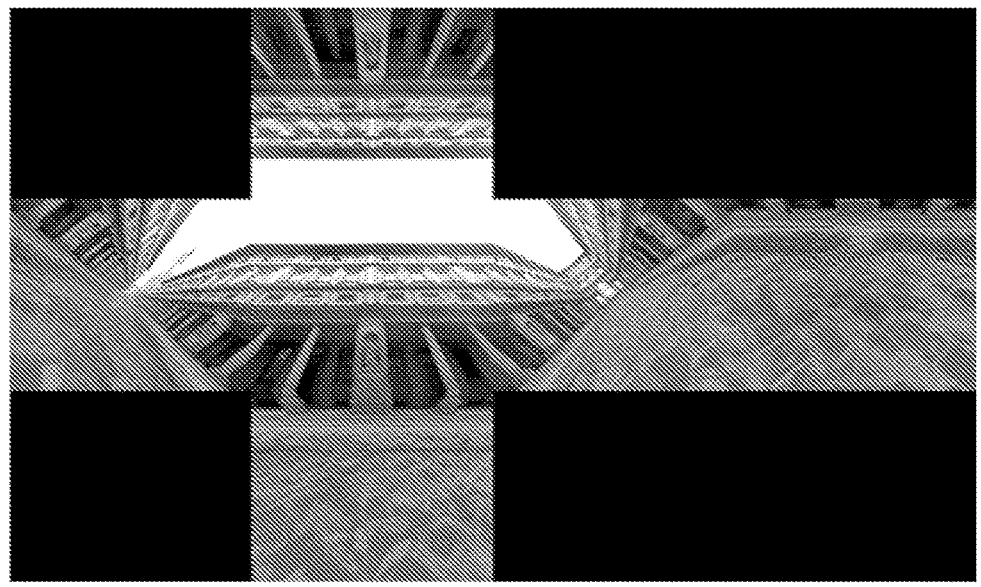
FIG. 5B
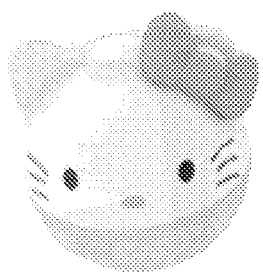
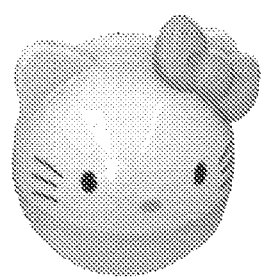
FIG. 6A  FIG. 6B

MIXED REALITY OBJECT RENDERING BASED ON ENVIRONMENT LIGHTING

CROSS-REFERENCE TO RELATED APPLICATION

This application is a U.S. National Stage Application of PCT/US2018/013753, filed Jan. 16, 2018, which claims benefit of Chinese Patent Application No. 201710059146.7, filed Jan. 23, 2017, which applications are hereby incorporated by reference. To the extent appropriate, a claim of priority is made to each of the above disclosed applications.

BACKGROUND

A wearable computing device is a portable device which can be directly borne on a user's body or worn on a user's clothes or accessories. Wearable computing devices take various forms, such as head-mounted devices like glasses and helmets, hand-mounted devices like watches and bracelets, leg-mounted devices like shoes and socks, as well as other forms like smart clothing, bags, crutches and accessories.

Through hardware and software support as well as data interaction and cloud interaction, wearable computing devices may provide a variety of functions, exerting an increasingly great influence on people's work, living and learning. Take a head-mounted device as an example. By combining virtuality and reality, the head-mounted device can provide better interactivity to users. In particular, a user may easily identify a virtual object in a real scenario and send instructions to the object, so that the object is caused to complete corresponding operations according to the instructions. By means of such kind of head-mounted devices, users may carry out operations in games, simulate real meetings and perform 3D modeling by gesturing, thereby effectively improving user interaction experience.

SUMMARY

However, traditional wearable computing devices usually render virtual objects according to predefined lighting conditions. No matter where the object is located, traditional wearable computing devices render the object by means of the same lighting conditions, so that a user cannot feel real lighting conditions in the real world.

To solve the above and potential problems, embodiments of the subject matter described herein provide an improved method and device for object rendering. According to the embodiments of the subject matter described herein, while rendering an object, a wearable computing device takes lighting conditions in the real world into account, thereby improving reality of the rendered object. In particular, the wearable computing device acquires environment lighting information of an object to be rendered and renders the object to a user based on the environment lighting information. The so-called environment lighting information here includes information concerning light intensities in multiple directions in an environment where the object is located. In this way, the object rendering of the wearable computing device will become more real and accurate. As such, the user can have a better interaction experience.

It is to be understood that the Summary is not intended to identify key or essential features of implementations of the subject matter described herein, nor is it intended to be used to limit the scope of the subject matter described herein.

Other features of the subject matter described herein will become easily comprehensible through the description below.

BRIEF DESCRIPTION OF THE DRAWINGS

Through the more detailed description in the accompanying drawings, the above and other features, advantages and aspects of the subject matter described herein will become more apparent, wherein the same or similar reference numerals refer to the same or similar elements.

FIGS. 5A and 5B show schematic diagrams of environment lighting information and an initial lighting map according to an embodiment of the subject matter described herein, respectively; and FIGS. 6A and 6B show schematic diagrams of an object rendered according to the prior art and an object rendered according to an embodiment of the subject matter described herein, respectively.

Throughout the figures, same or similar reference numbers will always indicate same or similar elements.

DETAILED DESCRIPTION

Embodiments of the subject matter described herein will be described in more detail with reference to the accompanying drawings, in which some embodiments of the subject matter described herein have been illustrated. However, the subject matter described herein can be implemented in various manners, and thus should not be construed to be limited to the embodiments disclosed herein. On the contrary, those embodiments are provided for the thorough and complete understanding of the subject matter described herein, and completely conveying the scope of the subject matter described herein to those skilled in the art. It should be understood that the accompanying drawings and embodiments of the subject matter described herein are merely for the illustration purpose, rather than limiting the protection scope of the subject matter described herein.

The term "include" and its variants used in embodiments of the subject matter described herein are to be read as open terms that mean "include, but is not limited to."The term "based on" is to be read as "based at least in part on." The terms "one embodiment" and "an implementation" are to be read as "at least one embodiment." The term "another embodiment" is to be read as "at least one other embodiment." Definitions of other terms will be presented in description below.

Traditionally, wearable computing devices use fixed lighting conditions in mixed reality, which merely can provide fixed preset parameters for object rendering. When users are in different real environments, virtual objects rendered by traditional wearable computing devices remain completely same and do not change as lighting conditions of the environment differ. Therefore, users can not feel the impact of real environments on the rendered objects, and thus user experience is degraded.

To this end, the subject matter described herein proposes a method and device for improving mixed reality object rending, which acquire environment lighting information of an object to be rendered and render the object to a user based on the environment lighting information. The environment lighting information discussed herein includes information about light intensities in a plurality of directions of an environment where the object is located. In this way, the method and device according to embodiments of the subject matter described here can apply environment lighting factors to the object rendering process, thereby rendering the object to the user more really and accurately. As such, the user experience can be improved effectively.

Figure 1:
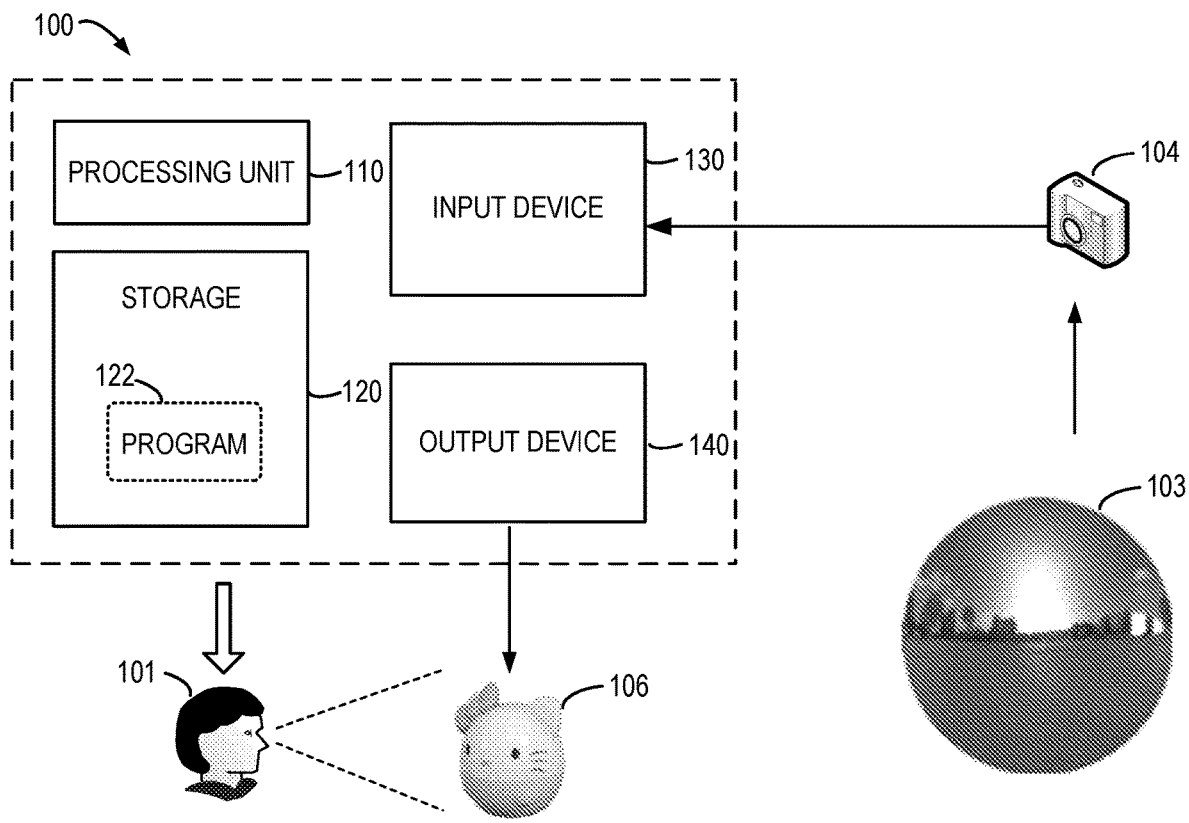
FIG. 1 shows a block diagram of a wearable computing device 100 in which one or more embodiments of the subject matter described herein can be implemented.

With reference to FIGS. 1 to 6, illustration is presented below to basic principles and several exemplary implementations of the subject matter described herein. FIG. 1 shows a block diagram illustrating a wearable computing device 100 in which the embodiments of the subject matter described herein can be implemented. It should be understood that the wearable computing device 100 shown in FIG. 1 is merely illustrative and does not form any limitation to the functionality and scope of the embodiments described herein.

The wearable computing device 100 may be used for implementing the object rendering process according to the embodiments of the subject matter described herein, and may be implemented in various forms such as smart glasses, smart helmets, smart headphones which are wearable for a user 101. The environment lighting information 105 concerning lighting conditions of an environment 103 in which an object 106 is currently located may be acquired by a camera 104, and the object 106 may be rendered to the user 101 based on the environment lighting information 105. The wearable computing device 100 may further adjust exposure parameters needed for acquiring the environment lighting information, as objects to be rendered differ. In addition, the wearable computing device 100 may quickly render the object by using the environment lighting information 105. Components of the wearable computing device 100 may include, but not limited to, one or more processors or processing units 110, a storage 120, one or more input devices 130 as well as one or more output devices 140. The processing unit 110 may be a real or virtual processor and can execute various processing according to programs stored in the storage 120. In a multi-processor system, multiple processing units concurrently execute computer executable instructions so as to increase the concurrent processing capability of the wearable computing device 100.

The wearable computing device 100 usually includes a plurality of computer storage media. Such media may be any available media that are accessible to the wearable computing device 100, including, but not limited to, volatile and non-volatile media, removable and non-removable media. The storage 120 may be a volatile memory (e.g., register, cache, random-access memory (RAM)), non-volatile memory (e.g., read-only memory (ROM), electrically erasable programmable read-only memory (EEPROM), flash memory), or some combination thereof. The storage 120 may also be removable or non-removable media, and may include machine readable media, such as flash drivers, magnetic disks or any other media, which can be used for storing information and/or data and which can be accessed within the wearable computing device 100.

The wearable computing device 100 may further include other removable/non-removable and volatile/non-volatile storage media. Although not shown in FIG. 1, there may be provided magnetic disk drivers for reading from or writing to removable and non-volatile magnetic disks, and optical disk drivers for reading from or writing to removable and non-volatile optical disks. In these cases, each driver may be connected to a bus (not shown) by one or more data media interfaces. The storage 120 may include one or more program products 122, with one or more program module sets, which program modules are configured to perform functions of various embodiments described herein.

The input device 130 may be one or more of different input devices, such as a mouse, keyboard, trackball, voice input device, etc. The output device 140 may be one or more output devices, such as a display, speaker, printer, etc.

As shown in FIG. 1, the camera 140 acquires an image of the environment 103 where the object 106 that is to be rendered is located, and provides the image to the input device 130 of the wearable computing device 100. Then, the wearable computing device 100 acquires environment lighting information based on the received image of the environment 103 and renders the object 106 based on the environment lighting information, so that the user 101 can see the object 106 having an environment lighting effect. It should be understood that the object 106 may be presented in any appropriate form, and what is shown in FIG. 1 is merely exemplary and not intended to limit the scope of the subject matter described herein.

Figure 2:
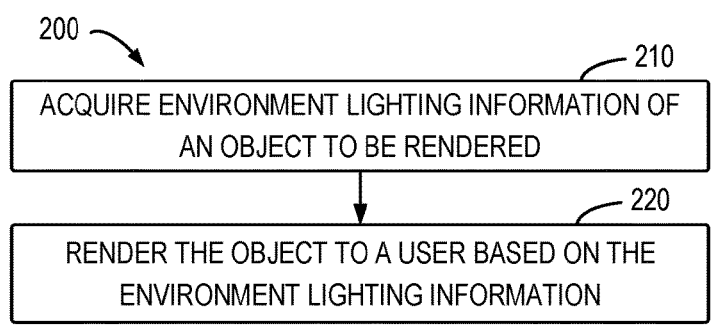
FIG. 2 shows a flowchart of a method 200 for rendering an object according to an embodiment of the subject matter described herein.

Several exemplary embodiments of the method and device for object rendering by considering environment lighting conditions will be described in more details. FIG. 2 shows a flowchart of a method 200 for rendering an object according to an embodiment of the subject matter described herein. It should be understood the method 200 may be executed by the processing unit 110 described with reference to FIG. 1.

At 210, environment lighting information of an object to be rendered is acquired. The environment lighting information includes information concerning light intensities in multiple directions of environment 103 in which the object 106 is located. According to the embodiment of the subject matter described herein, the user 101, the wearable computing device 100 and the object 106 are located in the same environment 103, so the environment 103 in which the object 106 is located is also the environment in which the user 101 and/or the wearable computing device 100 is located.

The environment lighting information may be acquired in a variety ways. In some embodiments, the wearable computing device 100 receives an image of the environment 103, in which the object 106 is located, captured by a camera 104 that operatively communicates with the wearable computing device 100. The camera 104 may be a normal camera such as a digital camera, a smart telephone, and a camera on a tablet computer, and may also be a panorama camera that can capture panorama images, such as Ricoh Theta S and so on. A panorama image is a 360° image of the environment 103 in which the object 106 is located, can provide more sufficient information about lighting in respective directions of the environment 103, and better helps the wearable computing device 100 to acquire overall environment lighting information. It should be understood the foregoing examples of panorama cameras or normal cameras are merely for the discussion purpose, which are not limiting or intended to limit the scope of the subject matter described herein in any way. Those skilled in the art may use any other available devices to acquire an image of the environment 103.

According to the embodiment of the subject matter described herein, the camera 104 operatively communicates with the wearable computing device 100. In one embodiment, the camera 104 and wearable computing device are separately disposed. The camera 104 may be disposed at a fixed location in relation to the wearable computing device 100, for example, a location in front of the wearable computing device 100 at a predefined distance. The camera 104 may be connected with the wearable computing device 100 via a communication network (e.g., WIFI, Bluetooth, etc.) and deliver the acquired image to the wearable computing device 100 in the form of a video stream.

Alternatively, in another embodiment, the camera 104 may be integrated on the wearable computing device 100, so that it can change its location according to the movement of the user 101 who wears the wearable computing device 100. In this way, the scenario captured by the camera 104 can be ensured to keep consistent with the location of the user 101. As a result, a lighting effect that better matches environment lighting can be acquired.

After receiving the image of environment 103 from the camera 104, the wearable computing device 100 may store the image in a temporary image buffer and acquire environment lighting information based on the image. In the embodiment of the subject matter described herein, the wearable computing device 100 may directly use the image as the environment lighting information, or use part of the image as the environment lighting information. For example, part of the image which has no relevance or low relevance to lighting may be removed, thereby decreasing data processing loads and increasing processing speed.

In some embodiments, when an object to be rendered differs, since the material and/or reflectance property of the object differs, the wearable computing device 100 may adjust the exposure time for the camera 104 to capture environment 103, thereby providing environment lighting information that better matches the object. In one embodiment, in response to detecting the object 106 to be rendered is different from a previously rendered object, the wearable computing device 100 determines an exposure compensation parameter associated with the object 106 and provides the exposure compensation parameter to the camera 104. In this way, the camera 104 may, based on the exposure compensation parameter, adjust the exposure time used for capturing an image of the environment 103, thereby providing an image that is more suitable to the object 106. Regarding the process of acquiring the environment lighting information, detailed description will be presented below with reference to FIG. 3.

At 220, the object is rendered to the user based on the environment lighting information. According to the embodiment of the subject matter described herein, the wearable computing device 100 may generate an initial lighting map associated with the object based on the environment lighting information. For example, the environment lighting information may be converted to a cube map as the initial lighting map. Next, the wearable computing device 100 performs down-sampling to the initial lighting map, for example, iteratively averages pixels in the initial lighting map by a predefined resolution reduction factor, thereby generating a set of down-sampled lighting maps having different resolutions.

Then, the wearable computing device 100 may determine an appearance of the object 106, based on the set of down-sampled lighting maps, for the rendering to the user 101. In the embodiment of the subject matter described herein, the appearance of the object 106 may be composed of a plurality of points. The wearable computing device 100 may use the set of down-sampled lighting maps to determine diffuse reflectance intensities and specular reflectance intensities of the plurality of points on the object 106. Afterwards, the appearance of the object 106 may be determined based on diffuse reflectance intensities and specular reflectance intensities of these points. Regarding the process of rendering the object to the user based on the environment lighting information, detailed description will be presented below with reference to FIG. 4.

In this way, a more real appearance of the object 106 under the current environment may be provided to the user 101, so that the reality of the user 101 is enhanced and user experience is effectively improved.

Figure 3:
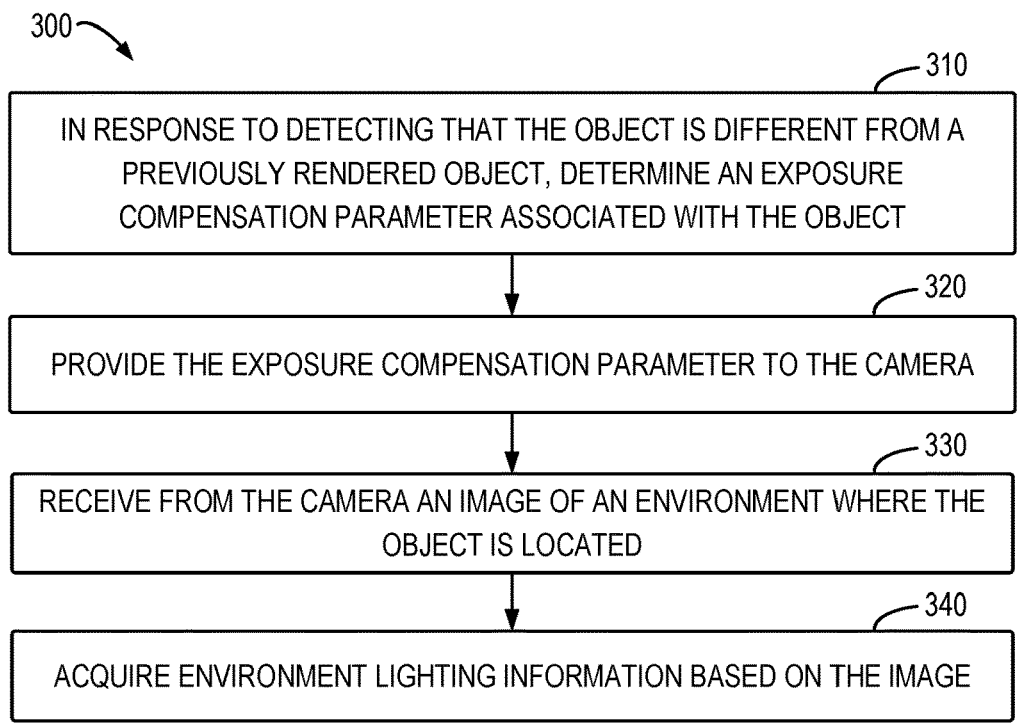
FIG. 3 shows a flowchart of a method 300 for acquiring environment lighting information according to an embodiment of the subject matter described herein.

Now with reference to FIG. 3, more detailed description is presented to embodiments of a method for acquiring environment lighting information. FIG. 3 shows a flowchart of a method 300 for acquiring environment lighting information according to an embodiment of the subject matter described herein. It should be understood method 300 may be executed by the processing unit 110 described with reference to FIG. 1, and the method 300 may be regarded as a specific embodiment of the method 200. It should further be understood the method 300 is merely exemplary but not limiting, operations of the method 300 may be added or removed properly, and may be executed in any other appropriate order.

At 310, in response to detecting that the object to be rendered is different from a previously rendered object, an exposure compensation parameter associated with the object is determined. In some embodiments, the camera 104 may be preset to work in an auto exposure mode. For example, a manufacturer may make factory settings of the exposure mode of the camera 104, or the wearable computing device 100 may set the exposure mode of the camera by sending instructions via a communication network. In the auto exposure mode, the camera 104 may capture images by automatically setting an exposure time in view of brightness of the current environment, thereby obtaining image data with appropriate exposure.

Upon detecting that the object 106 (e.g., a cat) to be rendered currently is different from the previously rendered object (e.g., a fish), the wearable computing device 100 may, according to different reflectances of objects to be rendered, send instructions to the camera 104 so as to set different exposure compensation parameters. In this way, the camera 104 may further adjust the exposure time based on the auto exposure.

In one embodiment, the exposure compensation parameter (denoted as "c" below) may be calculated by:

$$c = \log_2 R_{avg}, \quad (1)$$

wherein $R_{avg}$ denotes an average reflectance of the object's surface, which may be, for example, calculated by:

$$R_{avg} = \frac{1}{N} \sum_x (\rho_s(x) + \rho_d(x)), \quad (2)$$

wherein $\rho_s(x)$ and $\rho_d(x)$ are a specular reflectance coefficient and a diffuse reflectance coefficient at the $x^{th}$ point of the object's surface respectively, N is the total number of points on the object's surface, and $1 \leq x \leq N$. For a given object, these coefficients may be preset in association with the object, and thus the exposure compensation parameter c may be calculated from corresponding reflectance coefficients of a specific object.

At 320, the exposure compensation parameter is provided to the camera. When the camera 104 receives the exposure compensation parameter c, an actual exposure time (denoted as $E_{actual}$) may be calculated by:

$$E_{actual} = E * 2^c, \quad (3)$$

wherein E denotes the exposure time calculated under the auto exposure settings of the camera 104. For example, if the exposure compensation parameter c is −1.0, then the actual exposure time $E_{actual}$ is a half of the exposure time E calculated under the auto exposure settings. If the exposure compensation parameter c is +1.0, then $E_{actual}$ is twice as big as E.

Then, the camera 104 captures an image of the environment in which the object is currently located according to the calculated actual exposure time $E_{actual}$ and provides the image to the wearable computing device 100. In this way, quality of environment images captured for different objects may be improved effectively.

At 330, the wearable computing device 100 receives the image of environment 103 captured by the camera that operatively communicates with the wearable computing device. At 340, the environment lighting information is acquired based on the image. In some embodiments, the wearable computing device 100 may store the image in a temporary image buffer and use the image in its entirety or in part as the environment lighting information.

According to the embodiment of the subject matter described herein, the environment lighting information may be implemented as an image, a video or a file in any other appropriate format. It should be understood the environment lighting information which is described in the image form here is merely exemplary and not intended to limit the scope of the subject matter described herein.

Figure 4:
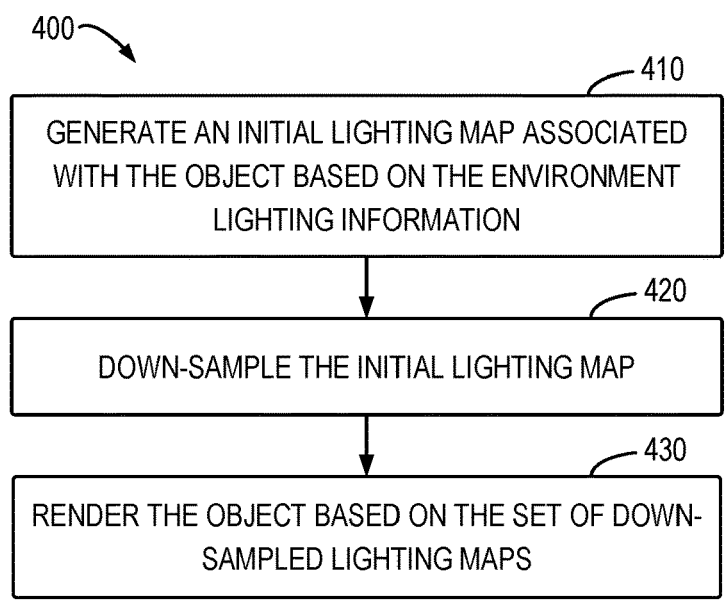
FIG. 4 shows a flowchart of a method 400 for rendering an object based on environment lighting information according to an embodiment of the subject matter described herein.

Now with reference to FIG. 4, more detailed description is presented to an embodiment of a method for rendering an object according to the subject matter described herein. FIG. 4 shows a flowchart of a method 400 for rendering an object based on environment lighting information according to an embodiment of the subject matter described herein. It should be understood the method 400 may be executed by the processing unit 110 as described with reference to FIG. 1, and also may be regarded as an exemplary embodiment of block 220 in method 200. It should further be understood method the 400 is merely exemplary but not limiting, operations in the method 400 may be added or removed properly and also may be executed in any other appropriate order.

At 410, an initial lighting map associated with the object is generated based on the environment lighting information. In some embodiments, the environment lighting information may be directly used as the initial lighting map. For example, if panorama the camera 104 is used for capturing lighting conditions of the environment (also referred to as "lighting environment"), then a panorama image sent by the panorama camera 104 to the wearable computing device 100 may take the form of a latitude/longitude map. That is, surrounding scenes are cut and tiled into an image. In the case that the panorama image is used as the environment lighting information, the initial lighting map may be the panorama image in the latitude/longitude map form. FIG. 5A shows a schematic view of environment lighting information according to an embodiment of the subject matter described herein.

As an alternative, in some embodiments, the environment lighting information may be converted to a stereogram, such as a cube map, a mirror ball etc., as the initial lighting map. Such conversion process may be completed by a predefined remapping operation. Take a cube map as an example. It uses a hexahedral cube to represent the surrounding lighting environment, which helps a graphics processing unit (GPU) of the wearable computing device 100 to render the object 106 more efficiently. FIG. 5B shows a schematic view of an initial lighting map in the form of a cube map according to an embodiment of the subject matter described herein.

At 420, down-sampling is performed to the initial lighting map to generate a set of down-sampled lighting maps having different resolutions.

Conventional down-sampling methods quickly render an object, which is under lighting environment in the form of a cube map, by applying pre-convolution on the cube map (also referred to as "lighting cube map" below). In particular, given a lighting cube map, conventional methods apply a convolution operation on the lighting cube map and reflectance functions with different roughness, to generate pre-convolution lighting cube maps that represent lighting reflectance effects under different roughness. Therefore, while rendering, a value may be taken from a corresponding pre-convolution lighting cube map according to roughness of a current object. The pre-convolution may be implemented in various ways. For example, $$I(\omega_o) = \frac{1}{M} \sum_{\omega_i} B(\gamma, \omega_N, \omega_o, \omega_i) L(\omega_i), \quad (4)$$

wherein $\omega_i$ denotes the position of the $i^{th}$ pixel on the lighting cube map and meanwhile, uniquely determines one direction in a space. M is the total number of pixels in the lighting cube map, and $1 \leq i \leq M$. It should be understood that the position of each pixel on the lighting cube map is associated with one direction in the space. $L(\omega_i)$ is a value of a pixel at the position $\omega_i$ of the lighting cube map.

$\omega_o$ denotes a position of a pixel of the pre-convolution cube map, $B(\gamma, \omega_N, \omega_i)$ is used for describing a reflectance function of a reflectance property for the object, and $\omega_N$ denotes the positive hemisphere orientation of a coordinate system as defined by the reflectance function. In one example, suppose $\omega_N = \omega_o$, and then $B(\gamma, \omega_N, \omega_o, \omega_i)$ may be abbreviated as $B(\gamma, \omega_o, \omega_i)$, wherein $\gamma$ is a roughness coefficient representing a degree of roughness of the object surface. It is clear that a pixel $I(\omega_o)$ on the pre-convolution cube map is a weighted sum of all pixels on the lighting cube map, a weight for each point is $B(\gamma, \omega_o, \omega_i)$, and the computation load is huge. In conventional solutions, since the lighting cube map is given in advance, this step is usually completed by offline calculation before the program is running. If the lighting cube map is obtained according to images which are collected by the camera 104 in real time (updated 10 to 20 times per second), then each time the lighting cube map is updated, the pre-convolution cube map needs to be recalculated, leading to huge calculation overheads.

To solve the foregoing problem, the embodiment of the subject matter described herein proposes a simplified solution for huge calculation overheads. For a given lighting cube map, a complete set of down-sampled lighting maps, e.g., a Mip-map chain, may be generated quickly. The set of down-sampled lighting maps are composed of lighting cube maps having different resolutions, and are approximate representations of lighting cube maps under different resolutions. The down-sampling solution according to the subject matter described herein may be implemented in various ways. In some embodiments, a predefined number (e.g., 4) of pixels at corresponding positions of the upper-layer lighting map may be directly averaged. For example, if the resolution of the initial lighting map is regarded as the first-layer lighting map resolution, and the resolution is $N_1*N_1*6$ (6 faces, with each face resolution being $N_1*N_1$), then the resolution of the $k^{th}$ layer lighting map, $N_k$, is:

$$N_k = \frac{N_1}{2^{k-1}}. \tag{5}$$

In the foregoing example, the pixel value $I_k(\omega_o)$ on the $k^{th}$ layer lighting map has such a relation with the pixel value $I_1(\omega_i)$ on the first layer lighting map as below:

$$I_k(\omega_o) = \sum_{\omega_i \in A_1(\omega_o)} \frac{1}{4^{k-1}} I_1(\omega_i). \tag{6}$$

The pixel value on the $k^{th}$ layer lighting map has such a relation with the pixel value on the $(k-1)^{th}$ layer lighting map as below:

$$I_k(\omega_o) = \sum_{\omega_i \in A_{k-1}(\omega_o)} \frac{1}{4} I_{k-1}(\omega_i). \tag{7}$$

wherein $A_1(\omega_o)$ is a projection at the first layer pixel $\omega_i$ for the $k^{th}$ layer pixel $\omega_o$.

For example, suppose the first layer resolution is 256*256, and the lighting maps in the set of down-sampled lighting maps reduces their resolutions layer by layer by a factor of 2. Thus, the resolution of the second layer is 128*128. Each pixel on the second layer lighting map represents 4 pixels on corresponding positions of the first layer lighting map, i.e., $A_1(\omega_o)$ contains 4 pixels. According to the above equation, the pixel value is also an average of these 4 pixels. In this way, each pixel on the third layer lighting map corresponds to 16 pixels at corresponding positions of the first layer lighting map, and the pixel value is an average of 16 pixels on the first layer lighting map. Meanwhile, each pixel on the third layer lighting map corresponds to 4 pixels at corresponding positions of the second layer lighting map, and the pixel value is an average of 4 pixels on the second layer lighting map.

Thereby, each layer lighting map in the set of down-sampled lighting maps is obtained by down-sampling the upper layer lighting map. The set of down-sampled lighting maps comprises lighting cube maps having different resolutions, and may also be regarded as lighting cube maps having different degrees of blur, which may be used for replacing lighting pre-convolution cube maps used by conventional solutions. The above embodiment of the subject matter described herein may quickly complete the down-sampling process and achieve a speed higher than real-time processing without expensive hardware devices.

Additionally, in some embodiments, regarding a cube map of each layer, a roughness coefficient corresponding thereto may be determined so as to be used for specular reflectance calculation for points on the surface of the object 106. For example, regarding the $k^{th}$ layer cube map, its corresponding roughness may be obtained by solving the following problem:

$$\operatorname{argmin}_{\gamma} \sum_{\omega_i} \|B(\gamma, \omega_o, \omega_i) - W_k(\omega_o, \omega_i)\|^2, \tag{8}$$

wherein $$W_k(\omega_o, \omega_i) = \begin{cases} \frac{1}{4^{k-1}}, & \omega_i \in A_1(\omega_o) \\ 0, & \text{else} \end{cases}. \tag{9}$$

In the above, $\omega_i$ denotes a pixels position on the first layer. Since the question is irrelevant to the concrete position of $\omega_o$, $\omega_o$ may be set to a pixel position corresponding to the spatial direction $(0, 0, 1)$ on the $k^{th}$ layer cube map. By solving Equation (9), a roughness coefficient $\gamma$ corresponding to the $k^{th}$ layer lighting map (suppose the set of down-sampled lighting maps comprises K layers of cube maps) may be determined and denoted as $\gamma_k$, wherein $k<K$.

It should be understood since the above solving is only correlated to the object's reflectance function B but is irrelevant to a specific lighting environment, the roughness coefficient may be offline calculated in advance. In one embodiment, correspondences between each layer of cube map and a roughness coefficient thereof may be stored in Table 1 as shown below.

TABLE 1

| Layer of Cube Map | Roughness Coefficient |
|---|---|
| 1 | $\gamma_1$ |
| 2 | $\gamma_2$ |
| ... | ... |
| k | $\gamma_k$ |
| ... | ... |
| K | $\gamma_K$ |

When the wearable computing device 100 performs real-time processing, it may directly look up a roughness coefficient corresponding to each layer of lighting map in Table 1. In this way, the processing speed may be further increased and the user experience can be improved.

Still refer to FIG. 4. At 430, an appearance of the object is determined based on the set of down-sampled lighting maps, so as to be rendered to a user. For each point on the object's surface, its final appearance (I) may be determined based on diffuse reflectance intensity ($I_d$) and specular reflectance intensity ($I_s$). In one embodiment, $$I = I_d + I_s. \tag{10}$$

For the user 101, the object's appearance comprises, for example, colors of one or more points on the object. Therefore, in embodiments of the subject matter described herein, the diffuse reflectance intensity is also referred to as diffuse reflectance color, and specular reflectance intensity is also referred to as specular reflectance color. Further embodiments of the subject matter described herein are now described to discuss calculation of the diffuse reflectance intensity and the specular reflectance intensity.

In some embodiments, while calculating the diffuse reflectance intensity, the surrounding lighting environment may be approximately represented using a layer having the lowest resolution in the set of down-sampled lighting maps. The lowest layer resolution is 1*1*6, i.e., the lowest layer has 6 faces, each of which has only one pixel representing an average lighting intensity for each of the 6 directions of the surrounding environment. If current lighting conditions are approximately represented using the 6 directions, then for any point x on the object's surface, its diffuse reflectance intensity $I_d(x)$ may be calculated as below:

$$I_d(x) = \sum_\omega \frac{\rho_d(x)}{R_{avg}}(\omega_N(x) \cdot \omega)L(\omega), \quad (11)$$

wherein $\omega$ is a lighting direction, i.e., 6 directions including up, down, left, right, front and rear, $L(\omega)$ is a pixel value of the lighting cube map in a corresponding direction, $\omega_N(x)$ is a surface normal direction of the point x, and $\omega_N(x) \cdot \omega$ represents an inner product of the normal direction and the lighting direction.

In some embodiments, when calculating the specular reflectance intensity, for any point x on the object's surface, its corresponding layer of lighting map in the set of down-sampled lighting maps may be determined from its surface roughness coefficient $\gamma(x)$. In particular, since roughness coefficients for respective layers down from the first layer increase monotonically, the first roughness coefficient $\gamma_k$ that is greater than $\gamma(x)$ may be found first, wherein $\gamma(x)$ ranges between $\gamma_{k-1}$ and $\gamma_k$. Then, the specular reflectance direction $\omega_R(x)$ may be calculated according to the user viewing direction $\omega_V(x)$ and the object's surface normal direction $\omega_N(x)$. Corresponding pixel values of the direction $\omega_R(x)$ on the $k^{th}$ layer lighting map and the $(k-1)^{th}$ layer lighting map are sampled and denoted as $L_k(\omega_R(x))$ and $L_{k-1}(\omega_R(x))$.

Next, the specular reflectance intensity $I_s(x)$ may be calculated according to:

$$I_s(x) = \frac{\rho_s(x)}{R_{avg}}(\omega_N(x) \cdot \omega_R(x))L(\omega_R(x)), \quad (12)$$

wherein $L(\omega_R(x))$ is obtained by interpolation of $L_k(\omega_R(x))$ and $L_{k-1}(\omega_R(x))$, for example, may be calculated by:

$$L(\omega_R(x)) = (1-f)L_{k-1}(\omega_R(x)) + fL_k(\omega_R(x)), \quad (13)$$

wherein the interpolation coefficient is:

$$f = \frac{\log_2(\gamma(x)) - \log_2(\gamma_{k-1})}{\log_2(\gamma_k) - \log_2(\gamma_{k-1})}. \quad (14)$$

It should be understood the above examples for calculation of the diffuse reflectance intensity and the specular reflectance intensity are merely illustrative but not limiting. In other embodiments of the subject matter described herein, the diffuse reflectance intensity and the specular reflectance intensity may be calculated from other appropriate equations.

According to the embodiment of the subject matter described herein, the wearable computing device 100 obtains environment lighting information and renders an object to a user based on the environment lighting information. Therefore, lighting conditions of the real world are considered in the process where the wearable computing device 100 renders the object 106, so that the reality of the rendered object is improved effectively and the user experience is enhanced. FIGS. 6A and 6B show an object rendered according to the prior art and an object rendered according to an embodiment of the subject matter described herein, respectively. It is clear compared with the object rendered according to the prior art as shown in FIG. 6A, the object rendered according to the embodiment of the subject matter described herein as shown in FIG. 6B has a better effect of environment lighting and presents to the user a stronger sense of reality. This can significantly improve the user experience and accuracy of user interaction.

The methods and functions described in this specification may at least partly executed by one or more hardware logic components, and illustrative types of usable hardware logical components include field programmable gate array (FPGA), application-specific standard product (ASSP), system on chip (SOC), complex programmable logic device (CPLD), etc.

Program codes for carrying out methods of the subject matter described herein may be written in any combination of one or more programming languages. These computer program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may be executed entirely on a machine, partly on the machine, as a stand-alone software package, partly on the machine and partly on a remote machine or entirely on the remote machine or server.

In the context of the subject matter described herein, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein. Certain features that are described in this specification in the context of separate implementations may also be implemented in combination in a single implementation. Conversely, various features that are described in the context of a single implementation may also be implemented in multiple embodiments separately or in any suitable sub-combination.

Listed below are some example implementations of the subject matter described herein.

The embodiments of the subject matter described herein include a computer implemented method. The method comprises: acquiring environment lighting information of an object to be rendered, the environment lighting information comprising information concerning light intensities in a plurality of directions in an environment where the object is located; and rendering the object to a user based on the environment lighting information.

In some embodiments, the acquiring environment lighting information of an object to be rendered comprises: receiving an image of the environment where the object is located captured by a camera that operatively communicates with the wearable computing device; and acquiring the environment lighting information based on the image.

In some embodiments, the acquiring environment lighting information of an object to be rendered further comprises: in response to detecting that the object is different from a previously rendered object, determining an exposure compensation parameter associated with the object; and providing the exposure compensation parameter to the camera, to enable the camera to adjust, based on the exposure compensation parameter, an exposure time used for capturing the image of the environment where the object is currently located.

In some embodiments, the image is a panorama image of the environment where the object is located.

In some embodiment, the rendering the object to a user based on the environment lighting information comprises: generating an initial lighting map associated with the object based on the environment lighting information; down-sampling the initial lighting map to generate a set of down-sampled lighting maps having different resolutions; and rendering the object based on the set of down-sampled lighting maps.

In some embodiments, the generating an initial lighting map associated with the object based on the environment lighting information comprises: converting the environment lighting information to a cube map as the initial lighting map.

In some embodiments, the down-sampling the initial lighting map comprises: iteratively averaging pixels in the initial lighting map by a predefined resolution reduction factor to obtain respective down-sampled lighting maps in the set of down-sampled lighting maps.

In some embodiments, the rendering the object based on the set of down-sampled lighting maps comprises: determine diffuse reflectance intensities and specular reflectance intensities of points on the object by using the set of down-sampled lighting maps; and rendering the object based on the diffuse reflectance intensities and the specular reflectance intensities.

The embodiments of the subject matter described herein include a wearable computing device, comprising: a processing unit; a memory, coupled to the processing unit and having instructions stored therein which, when executed by the processing unit, perform actions as below: acquiring environment lighting information of an object to be rendered, the environment lighting information comprising information concerning light intensities in a plurality of directions in an environment where the object is located; and rendering the object to a user based on the environment lighting information.

In some embodiments, the acquiring environment lighting information of an object to be rendered comprises: receiving an image of the environment where the object is located captured by a camera that operatively communicates with the wearable computing device; and acquiring the environment lighting information based on the image.

In some embodiments, the acquiring environment lighting information of an object to be rendered further comprises: in response to detecting that the object is different from a previously rendered object, determining an exposure compensation parameter associated with the object; and providing the exposure compensation parameter to the camera to enable the camera to adjust, based on the exposure compensation parameter, an exposure time used for capturing the image of the environment where the object is currently located.

In some embodiments, the image is a panorama image of the environment where the object is located.

In some embodiment, the rendering the object to a user based on the environment lighting information comprises: generating an initial lighting map associated with the object based on the environment lighting information; down-sampling the initial lighting map to generate a set of down-sampled lighting maps having different resolutions; and rendering the object based on the set of down-sampled lighting maps.

In some embodiments, the generating an initial lighting map associated with the object based on the environment lighting information comprises: converting the environment lighting information to a cube map as the initial lighting map.

In some embodiments, the down-sampling the initial lighting map comprises: iteratively averaging pixels in the initial lighting map by a predefined resolution reduction factor to obtain respective down-sampled lighting maps in the set of down-sampled lighting maps.

In some embodiments, the rendering the object based on the set of down-sampled lighting maps comprises: determining diffuse reflectance intensities and specular reflectance intensities of points on the object by using the set of down-sampled lighting maps; and rendering the object based on the diffuse reflectance intensities and the specular reflectance intensities.

The embodiments of the subject matter described herein further provide a computer program product stored in a non-transient storage medium and including machine executable instructions which, when running on a wearable computing device, cause the device to: acquire environment lighting information of an object to be rendered, the environment lighting information comprising information concerning light intensities in a plurality of directions in an environment where the object is located; and render the object to a user based on the environment lighting information.

In some embodiments, the machine executable instructions, when running on a device, further cause the device to: receive an image of the environment where the object is located captured by a camera that operatively communicates with the wearable computing device; and acquire the environment lighting information based on the image.

In some embodiments, the machine executable instructions, when running on a device, further cause the device to: in response to detecting that the object is different from a previously rendered object, determine an exposure compensation parameter associated with the object; and provide the exposure compensation parameter to the camera, to enable the camera to adjust, based on the exposure compensation parameter, an exposure time used for capturing the image of the environment where the object is currently located.

In some embodiments, the image is a panorama image of the environment where the object is located.

In some embodiment, the machine executable instructions, when running on a device, further cause the device to: generate an initial lighting map associated with the object based on the environment lighting information; down-sample the initial lighting map to generate a set of down-sampled lighting maps having different resolutions; and render the object based on the set of down-sampled lighting maps.

In some embodiments, the machine executable instructions, when running on a device, further cause the device to: convert the environment lighting information to a cube map as the initial lighting map. In some embodiments, the machine executable instructions, when running on a device, further cause the device to: iteratively average pixels in the initial lighting map by a predefined resolution reduction factor to obtain respective down-sampled lighting maps in the set of down-sampled lighting maps.

In some embodiments, the machine executable instructions, when running on a device, further cause the device to: determine diffuse reflectance intensities and specular reflectance intensities of points on the object by using the set of down-sampled lighting maps; and render the object based on the diffuse reflectance intensities and the specular reflectance intensities.

Although the subject matter described herein has been described in a language specific to structural features and/or method logic actions, it should be appreciated that the subject matter as defined in the appended claims is not limited to the specific features or actions described above. On the contrary, the specific features and actions described above are merely example forms for implementing the claims.

The invention claimed is:

1. A wearable computing device comprising a head-mounted display, the wearable computing device comprising:
    a processing unit;
    a memory coupled to the processing unit and storing instructions which, when executed by the processing unit, perform acts including:
        acquiring, in real-time, environment lighting information of an object to be rendered, the environment lighting information including information concerning light intensities in a plurality of directions in an environment where the object is located;
        generating, in real-time, a lighting map associated with the object based on the environment lighting information;
        down-sampling, in real-time, the lighting map to generate a set of down-sampled lighting maps having different resolutions; and
        rendering, via the head-mounted display, the object to a user based on the set of down-sampled lighting maps, wherein the rendering is based on diffuse reflectance intensities of points on the object, the diffuse reflectance intensities being determined based on a lighting map having a lowest resolution of the set of down-sampled lighting maps.

2. The device according to claim 1, wherein acquiring the environment lighting information of the object to be rendered comprises:
    receiving an image of the environment where the object is located captured by a camera that operatively communicates with the wearable computing device; and
    acquiring the environment lighting information based on the image.

3. The device according to claim 2, wherein acquiring the environment lighting information of the object to be rendered further comprises:
    in response to detecting that the object is different from a previously rendered object, determining an exposure compensation parameter associated with the object; and
    providing the exposure compensation parameter to the camera, to enable the camera to adjust, based on the exposure compensation parameter, an exposure time used for capturing the image of the environment where the object is currently located.

4. The device according to claim 2, wherein the image is a panorama image of the environment where the object is located.

5. The device according to claim 1, wherein generating the lighting map associated with the object based on the environment lighting information comprises:
    converting the environment lighting information to a cube map as the lighting map.

6. The device according to claim 1, wherein down-sampling an initial lighting map comprises:
    iteratively averaging pixels in the initial lighting map by a predefined resolution reduction factor to obtain respective down-sampled lighting maps in the set of down-sampled lighting maps.

7. The device according to claim 1, wherein rendering the object based on the set of down-sampled lighting maps further comprises:
    determining specular reflectance intensities of points on the object by using the set of down-sampled lighting maps; and
    rendering the object further based on the specular reflectance intensities.

8. The device according to claim 7, wherein the specular reflectance intensities of points on the object are determined based on a surface roughness coefficient of the respective points on the object.

9. A method implemented by a wearable computing device comprising a head-mounted display, the wearable computing device comprising:
    acquiring, in real-time, environment lighting information of an object to be rendered, the environment lighting information including information concerning light intensities in a plurality of directions in an environment where the object is located;
    generating, in real-time, a lighting map associated with the object based on the environment lighting information;
    down-sampling, in real-time, the lighting map to generate a set of down-sampled lighting maps having different resolutions; and
    rendering, via the head-mounted display, the object to a user based on the set of down-sampled lighting maps, wherein the rendering is based on diffuse reflectance intensities of points on the object, the diffuse reflectance intensities being determined based on a lighting map having a lowest resolution of the set of down-sampled lighting maps.

10. The method according to claim 9, wherein acquiring the environment lighting information of the object to be rendered comprises:
    receiving an image of the environment where the object is located captured by a camera that operatively communicates with the wearable computing device; and
    acquiring the environment lighting information based on the image.

11. The method according to claim 10, wherein acquiring the environment lighting information of the object to be rendered further comprises:

in response to detecting that the object is different from a previously rendered object, determining an exposure compensation parameter associated with the object; and providing the exposure compensation parameter to the camera, to enable the camera to adjust, based on the exposure compensation parameter, an exposure time used for capturing the image of the environment where the object is currently located.

12. The method according to claim 9, wherein down-sampling an initial lighting map comprises:

iteratively averaging pixels in the initial lighting map by a predefined resolution reduction factor to obtain respective down-sampled lighting maps in the set of down-sampled lighting maps.

13. The method according to claim 9, wherein rendering the object based on the set of down-sampled lighting maps further comprises:

determining specular reflectance intensities of points on the object by using the set of down-sampled lighting maps; and rendering the object further based on the specular reflectance intensities.

14. The method according to claim 13, wherein the specular reflectance intensities of points on the object are determined based on a surface roughness coefficient of the respective points on the object.

15. A computer program product stored in a non-transient storage medium and including machine executable instructions which, when running on a wearable computing device comprising a head-mounted display, cause the wearable computing device to:

acquire, in real-time, environment lighting information of an object to be rendered, the environment lighting information including information concerning light intensities in a plurality of directions in an environment where the object is located;

generating, in real-time, a lighting map associated with the object based on the environment lighting information;

down-sampling, in real-time, the lighting map to generate a set of down-sampled lighting maps having different resolutions; and render, via the head-mounted display, the object to a user based on the set of down-sampled lighting maps, wherein the rendering is based on diffuse reflectance intensities of points on the object, the diffuse reflectance intensities being determined based on a lighting map having a lowest resolution of the set of down-sampled lighting maps.

16. The computer program product of claim 15, wherein the acquiring the environment lighting information of the object to be rendered comprises:

receiving a panoramic image of the environment where the object is located captured by a camera integrated on the wearable computing device; and acquiring the environment lighting information based in part on the image.

17. The computer program product of claim 16, wherein at least a portion of the environment lighting information is acquired directly from the environment where the object is located.

18. The computer program product of claim 16, wherein rendering the object based on the set of down-sampled lighting maps further comprises:

determining specular reflectance intensities of points on the object by using the set of down-sampled lighting maps; and rendering the object further based on the specular reflectance intensities.

19. The computer program product according to claim 18, wherein the specular reflectance intensities of points on the object are determined based on a surface roughness coefficient of the respective points on the object.

20. The computer program product of claim 16, wherein acquiring the environment lighting information of the object to be rendered further comprises:

in response to detecting that the object is different from a previously rendered object, determining an exposure compensation parameter associated with the object; and providing the exposure compensation parameter to the camera.

* * * * *